United States Patent [19]
Hoerz

[11] Patent Number: 5,997,019
[45] Date of Patent: Dec. 7, 1999

[54] PROPELLED DEVICE WITH WHEELS AND PEDAL ELEMENTS

[76] Inventor: Erich Hoerz, Lichtensteinstrasse 50, D-72525 Munsingen, Germany

[21] Appl. No.: 08/817,037
[22] PCT Filed: Aug. 18, 1995
[86] PCT No.: PCT/EP95/03291
  § 371 Date: Aug. 28, 1997
  § 102(e) Date: Aug. 28, 1997
[87] PCT Pub. No.: WO96/09953
  PCT Pub. Date: Apr. 4, 1996

[30] Foreign Application Priority Data

Sep. 29, 1994 [DE] Germany .......................... 94 15 598 U

[51] Int. Cl.$^6$ ...................................................... B62M 1/02
[52] U.S. Cl. ............................ 280/209; 280/221; 280/229
[58] Field of Search .................................... 280/209, 210, 280/220, 221, 208, 205, 229

[56] References Cited

U.S. PATENT DOCUMENTS

| | | | |
|---|---|---|---|
| 3,318,614 | 5/1967 | Lee | 280/221 |
| 3,506,283 | 4/1970 | Tant | 280/221 |
| 4,786,068 | 11/1988 | Tang | 280/221 |
| 4,786,069 | 11/1988 | Tang | 280/221 |
| 5,011,171 | 4/1991 | Cook | 280/221 |
| 5,129,664 | 7/1992 | Chen | 280/221 |
| 5,421,794 | 6/1995 | Du | 482/57 |

FOREIGN PATENT DOCUMENTS 1757695   8/1992   U.S.S.R. ................................ 280/221

*Primary Examiner*—Lanna Mai
*Assistant Examiner*—Avraham H. Lerner
*Attorney, Agent, or Firm*—Pandiscio & Pandiscio

[57] ABSTRACT

A manually propelled device includes two base modules having at least two wheels interconnected by a pedal element. The device is provided with at least four wheels which are parallel with each other. The pedal elements each interconnect two of the wheels and are fixed to the two interconnected wheels at points off-set from the centers of the two wheels. A shaft interconnects the centers of one of the wheels of each of the modules, thereby interconnecting the modules. Pedaling of the pedal elements by the feet of an operator serves to cause rotation of the wheels in a same rotating direction to propel the device in a selected linear direction.

8 Claims, 4 Drawing Sheets

PROPELLED DEVICE WITH WHEELS AND PEDAL ELEMENTS

The invention relates to a propelled device with several wheels and several pedal elements which are attached to the wheels in the manner of a pedal crank, by means of which the wheels can be driven.

BACKGROUND OF THE INVENTION

FIELD OF THE INVENTION

Such propelled devices operating according to the pedal crank principle, in which the pedal elements are arranged eccentrically with respect to the respective wheel centre-point and at least partially offset with respect to each other in the direction of the wheel circumference, are known as a kit system under the trademark "pedalo". A single propelled device in which three wheels running next to each other can be driven by two pedal elements arranged in between in each case serves as the basic element. In the context of the known pedalo system, this basic module may then be extended, for example, by addition of a second, rear single propelled device which is connected to the first propelled device via two footboards which are mounted in each case on two pedal elements lying in a line parallel to the direction of travel. A track widening may be further brought about in this double propelled device produced in this way by means of an add-on module. This comprises two wheels connected eccentrically via a further pedal element, one or each of which may be mounted onto the wheel outer side of a single or double propelled device. By using the imagination further possible combinations and forms may be devised, although on the basis of the said three-wheel and two-wheel modules they may soon find their limits. Furthermore, the three-wheel modules are relatively expensive to make, and assembly by means of building on further three- or two-wheel modules requires a great deal of complicated accuracy when making the component parts.

This therefore produces the problem on which the invention is based, that of creating a propelled device which can be manufactured with reduced outlay and can be assembled more accurately. The combination flexibility should be increased at the same time.

SUMMARY OF THE INVENTION

As a solution, with a propelled device with the above-mentioned features it is proposed according to the invention that it is formed with two or more base modules each of two wheels which are connected in a rotation-resistant manner via one in each case of the appropriately at least two pedal elements, wherein the two or more base modules are coupled to each other directly or indirectly in such a way that their wheels run parallel and/or next to each other in the direction of travel. This achieves the advantage in terms of production technology that only one uniform basic and/or base module, which is obviously simplified with respect to the three-wheel module previously required with the pedalo system, has to be manufactured for the propelled device according to the generic type. In other words, a novel pedalo system which can be assembled solely from two-wheel modules can be created.

With particular advantage, one or more spacers are provided between two base modules connected together. By this means the track width and/or breadth of the propelled device can be accurately set and/or widened, particularly it several spacers are arranged one behind the other in a common line. The accuracy of the setting of the spacing between two base modules and/or of the track breadth of the propelled device then depends on the size and/or length of the spacers arranged one behind the other in series, When the propelled device according to the generic type is used for the first time, the problem arises of lack of practice and/or inadequately trained movement and balance motoricity. For this purpose, in the known pedalo system two three-wheel modules are coupled one behind the other in the direction of travel via footboards. If the footboards are long enough and moreover also provided with vertical supports which project upwards and can be grasped manually, this produces a so-called rehabilitation propelled device, particularly suitable for training the disabled, convalescents and/or sportspeople. In this respect an advantageous embodiment of the invention comprises the fact that at least two groups of base modules connected together so that they run parallel (two, three, four, etc. base/two-wheel modules mounted so that they run next to each other) are arranged one behind the other in the direction of travel and are coupled together by means of one or more connection elements. The connection elements may be appropriately formed as tread elements, particularly as the said footboards, which then appropriately run in and/or parallel to the direction of travel. The connection elements produced in this way are attached in each case to pedal elements which belong to base modules, running one behind the other in a common line, of different (arranged one behind the other) groups of several base modules. The pedal elements are preferably rotatably mounted on the underside of the tread elements.

In the context of the general inventive concept, to produce the propelled device a kit is suitable which comprises two or more base modules each comprising two wheels connected in a rotation-resistant manner via an eccentric crank element as well as connecting means for coupling the base modules, in such a way that the wheels of the coupled base modules run parallel and/or next to each other in the direction of travel. If a propelled device is to be created which is extended in its length and which has a set of wheels both at the beginning and at the end, an appropriate extension of the kit according to the invention comprises at least two connection elements with which base modules, running in a line in the direction of travel, of two base module groups arranged one behind the other may be coupled.

The invention also relates to a propelled device of the above-mentioned kind in particular which has at least four wheels running parallel and/or next to each other in the direction of travel and is provided with at least three pedal elements which connect three or four of these wheels in a rotation-resistant manner and are attached thereto in the manner of a pedal crank, i.e. are arranged eccentrically with respect to the respective wheel centre-point and offset with respect to each other in the circumferential direction.

Such propelled devices have become known through the above-mentioned pedalo system: for track widening, a three-wheel module and a two-wheel module are mounted on each other in such a way that their wheels facing each other adjoin with their outer sides, and that all five wheels run parallel next to each other. In this case the wheels of the two- and three-wheel module in each case are connected only via eccentrically arranged pedal elements which constantly move up and down during travel. With propelled devices according to the generic type there is therefore a considerable need for a possibility of having available a part that lies still during travel, as a surface to sit or lie on, for example.

To solve this problem, it is proposed according to the invention that at least two of the wheels are connected in a rotation-resistant manner by means of a shaft which is centric and/or runs coincident with the wheel centre axle. By fixing and positioning at least one connection element between two wheels not eccentrically but centrally, corresponding to the wheel centre axle, therefore, a support frame for surfaces to sit or lie on can advantageously be fitted to it, which frame may remain at the same height and constantly still during travel.

This alternative invention may easily be combined with the first-mentioned invention alternative—use of two base modules—by fitting the shaft centrically on tile wheel and/or wheels either of one or two base modules, This creates a configuration in which four wheels run next to each other and/or parallel in the direction of travel, between which either one of the two pedal elements or the centric shaft runs in each case. The centric shaft may be arranged either between the two inner wheels or between an inner and an outer of the four wheels running next to each other, In connection with the first-mentioned invention alternative regarding base modules, the second invention alternative may be further developed with particular advantage in that a supplementary module is introduced comprising the two wheels which are connected together in a rotation-resistant manner via the centric shaft and have at their outer sides coupling means, such as eccentrically formed connection bores, via which a rigid and/or stiff movement coupling with the wheels of the base modules can be brought about.

A kit for the propelled device with at least one centric shaft is distinguished by the said supplementary module and may also comprise the above-mentioned base modules.

Further details, features and advantages on the basis of the invention will emerge from the sub-claims and from the description which follows of preferred exemplary embodiments of the invention and the drawings in which:

DECRIPTION OF THE PREFERRED EMBODIMENTS

Figure 1:
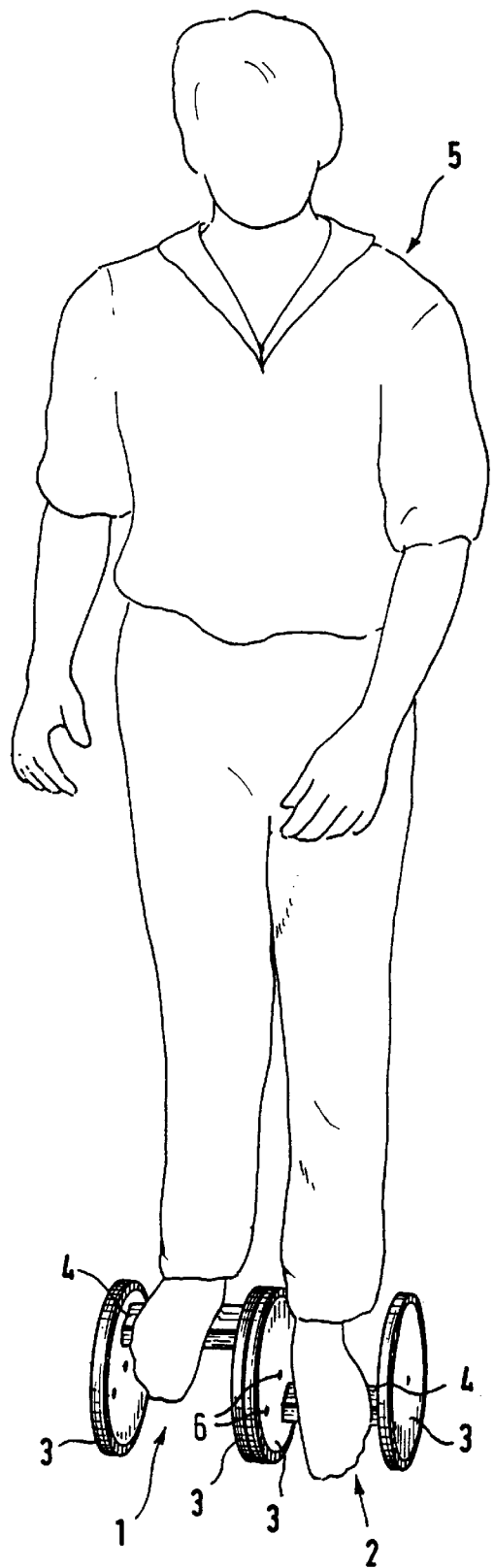
FIG. 1 shows a perspective view of a basic form of the propelled device according to the invention.

According to FIG. 1 an exemplary propelled device is formed with two base modules 1, 2, which are each formed of two wheels 3 and one pedal element 4 connecting these wheels in a rotation-resistant manner. The user 5 stands upright with a foot on each of the pedal elements 4 which run eccentrically between the two respective wheels 3 of the base modules 1, 2. To couple the two base modules together, in each case the wheels that are closest together are coupled together in a flush and/or coincident manner via at least partially eccentric screw connections 6. Stepping down on the pedal element 4 of the first base module 1 causes the outer wheels 3 of the second base module 2 also to be co-rotated via the two inner wheels 3 of the overall arrangement which are coupled together.

Figure 2:
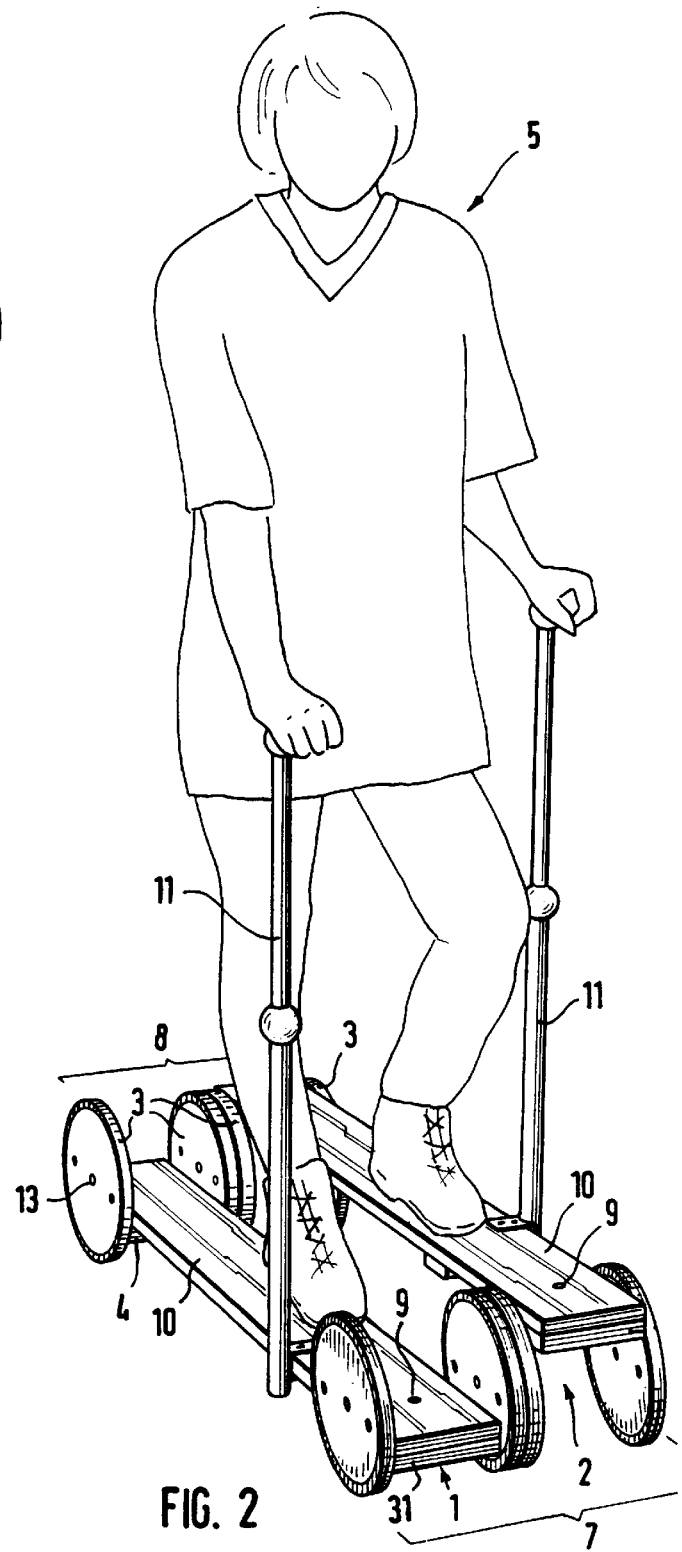
FIG. 2 shows a perspective view of another embodiment of the propelled device according to the invention.

According to FIG. 2 the propelled device according to the invention is expanded to an exercise and/or rehabilitation device: in addition to a first, front group 7 with base modules 1, 2 coupled together as in FIG. 1, there is also a second correspondingly formed group 8 at the rear end of the propelled device with four wheels 3 running parallel. Via a screw connection 9 in each case a footboard 10 is mounted on the two pedal elements 4 which lie in a line, viewed in the direction of travel, and belong to different groups 7, 8 of base modules. In the position shown, the two footboards 10 running next to each other are staggered in height with respect to each other, which corresponds to the offset position of the respective pedal elements 4 with respect to each other in the wheel circumferential direction, which pedal elements are connected either to the right-hand or the left-hand footboard 10. To facilitate handling by the user 5, a telescopic support 11 which extends upwards at right angles with respect to the footboard surface is arranged on the outer side of each footboard 10.

Figure 3:
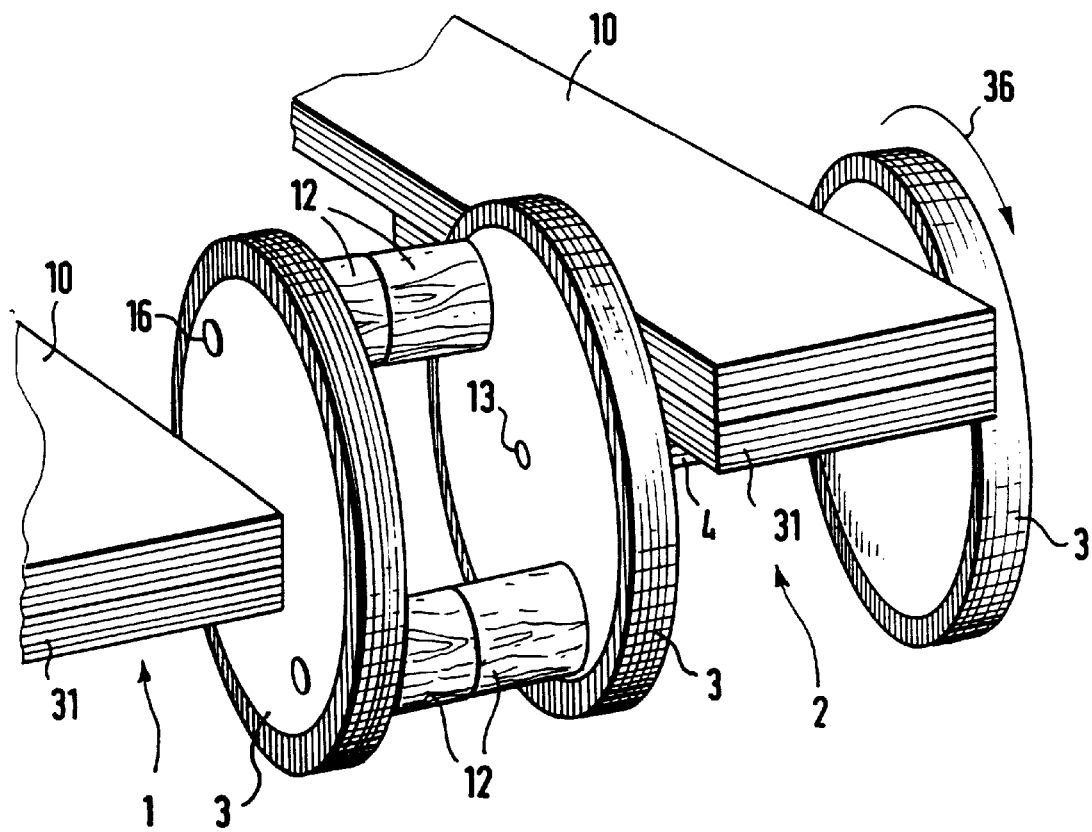
FIG. 3 shows a perspectively broken-down view of a further embodiment of the propelled device according to the invention.

According to FIG. 3 the track breadth of the vehicle according to the invention according to FIG. 2, for example, is widened by means of spacer sleeves 12 which respectively adjoin the outer side and/or the front side of a wheel 3 of base modules 1, 2 which are different but run next to each other in the direction of travel. In the example shown, in each case two cylinder-like sleeves 12 which are eccentric with respect to the wheel center-point 13 adjoin each other with their front sides which face each other; their respectively opposite front sides adjoin the opposing front sides of the wheels 3 lying closest together of base modules 1, 2 coupled together at the same height of direction of travel.

Figure 4:
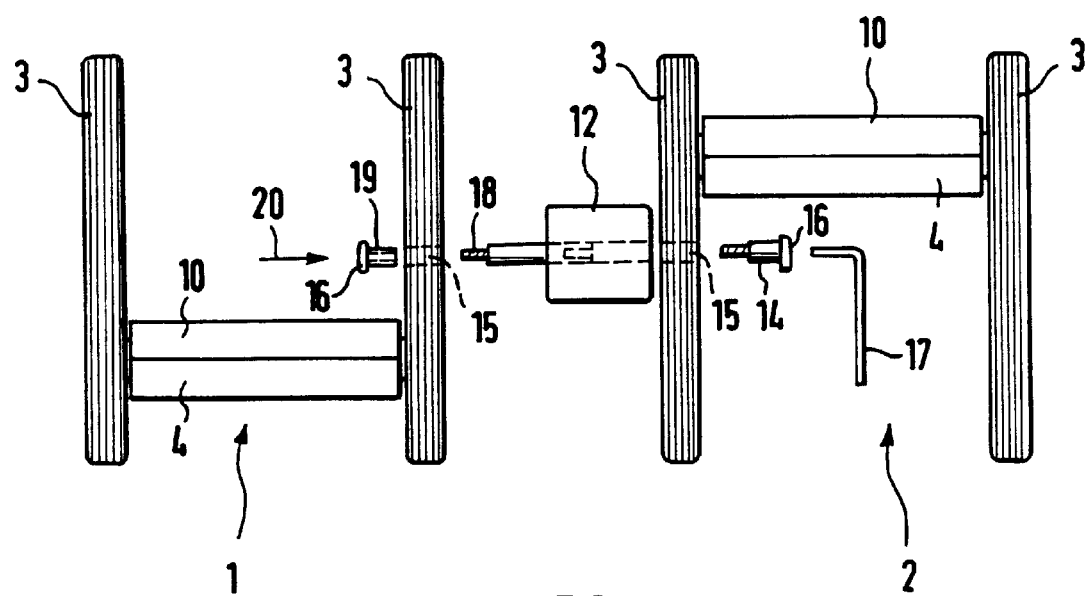
FIG. 4 shows an exploded front view of the assembly of an embodiment of the propelled device according to the invention.

According to FIG. 4 the coupling of the two base modules 1, 2 with wheels 3 running next to each other is achieved by means of connecting screws 14 which are pushed through axis-parallel, eccentric bores 15 as well as through the spacer sleeve 12 covering the bore 15 at the front side. A screw head 16, which can be turned by a polygonal wrench 17 via a polygonal recess (not shown), comes to rest in engaging manner on the inside of the wheel 3 to be connected of the one base module 2 (on the right-hand side in the drawing), The free end, opposite the screw head 16, with external thread lb of the connecting screw 14 is allocated to a nut 19, which is also provided with a polygonal screw head 16 and is to be pushed through an eccentric connecting bore 15 so that it can come into engagement with the external thread 18. The direction of insertion 20 for the nut 19 is indicated on the drawing.

Figure 5:
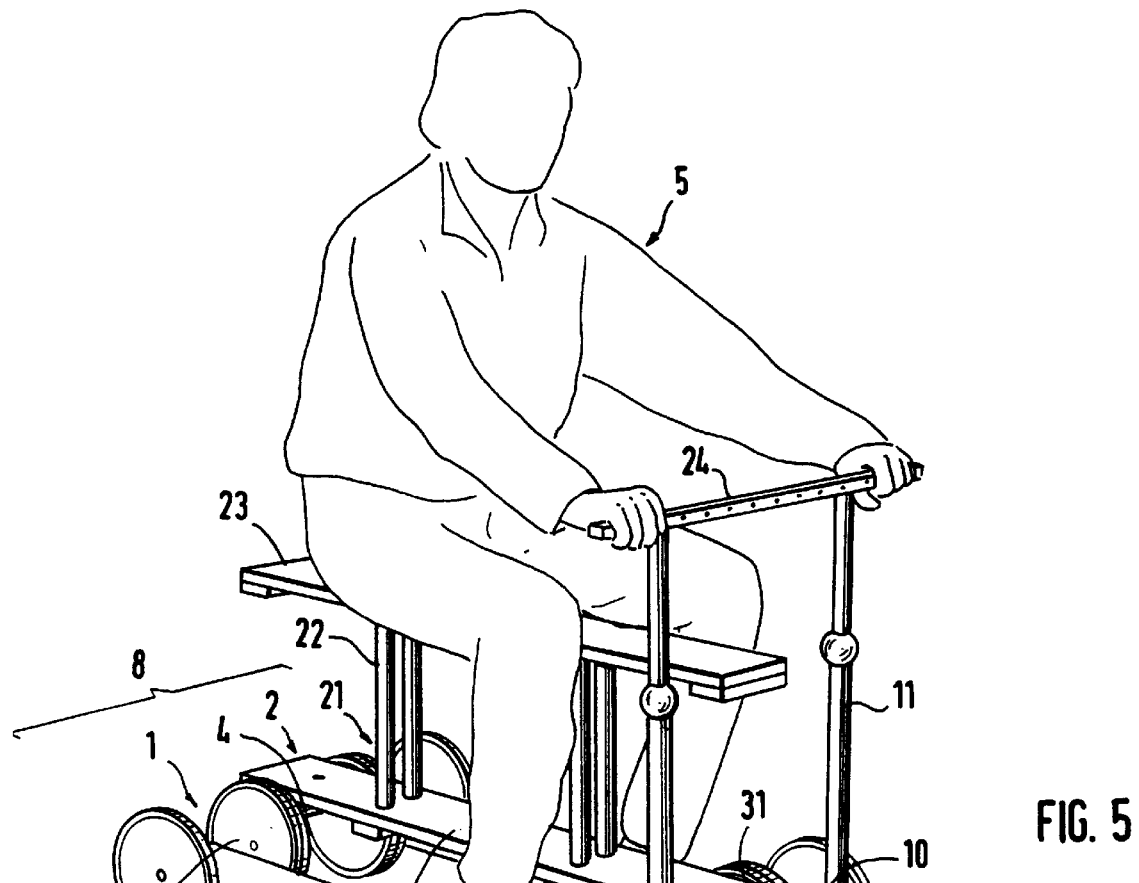
FIG. 5 shows a perspective view of a further embodiment of the propelled device according to the invention.

According to FIG. 5 also, two groups 7, 8 arranged one behind the other in the direction of travel are provided with base modules coupled parallel next to each other. Each of these groups has three base modules 1, 2, 21 which are coupled to each other in series transverse to the direction of travel, similar to the illustration in FIG. 1 or 2, i.e. with no spacer sleeves in between. The two pedal elements 4 in each case of base modules which are in a common line in the direction of travel are connected together via footboards 10, by analogy with FIG. 2. In the position shown the two outer footboards 10 are at the same height with respect to the ground whereas the middle footboard 10 is offset upwards. This is based on the fact that the pedal elements 4 on which the footboards 10 are mounted are partially offset with respect to each other in the circumferential direction. Whereas the pedal elements 4 of the outer base modules 1, 21 in each case are arranged in the same manner with respect to the wheel circumference and/or the angular position, the respective pedal elements of the two middle base modules 2 have another wheel circumference and/or angular position, preferably offset by 180°. The middle footboard 10 carries a seat board 23 for the user 5 via a frame 22 of vertically running support rods, The user's hands grasp a transverse bar 24 which connects together the free upper ends of two telescopic supports 11. The bottom ends of the telescopic supports 11 are fixed at the foremost front sides of the two outer footboards. If via his or her feet the user 5 transmits a force and/or acceleration to the two outer footboards 10 and hence to the pedal elements 4 underneath them, all the wheels 3 are caused to rotate. The two outer footboards 10 on the one hand and the middle footboard with the seating surface 23 on the other hand move up and down, constantly offset with respect to each other, corresponding to the angularly displaced arrangement of the pedal elements 4 of the inner base modules 2 with respect to the pedal elements 4 of the two outer base modules 1, 21 respectively with regard to the circumference of the coaxially arranged wheels 3.

Figure 6A:
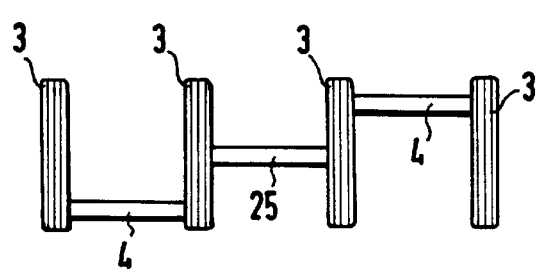
FIGS. 6a and 6b show a diagrammatic front view of further embodiments for the propelled device according to the invention.

With the arrangement shown in FIG. 6a it may be achieved that the centrally arranged seating surface 23 according to FIG. 5 would not move up and down with travel movement. Since of the four wheels 3 arranged next to each other in the direction of travel, the two inner ones are connected together in a rotation-resistant manner with a centric shaft 25 whereas the two outer wheels are respectively connected in a rotation-resistant manner to the nearest inner wheel 3 via an eccentric pedal element 4.

Figure 6B:
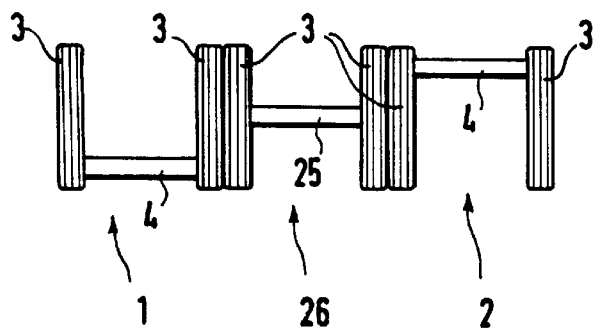

The arrangement according to FIG. 6b differs from that according to FIG. 6a by the use of two base modules 1, 2 which are coupled together indirectly via a supplementary module 26, This is formed from the centric shaft 25 and the two wheels 3 arranged centrally on it and in a rotation-resistant manner. With its outer front side each of these wheels is coupled, eccentrically screwed on for example, in a rotation-resistant manner to the nearest wheel of the adjacent base module 1 and/or 2.

Figure 7:
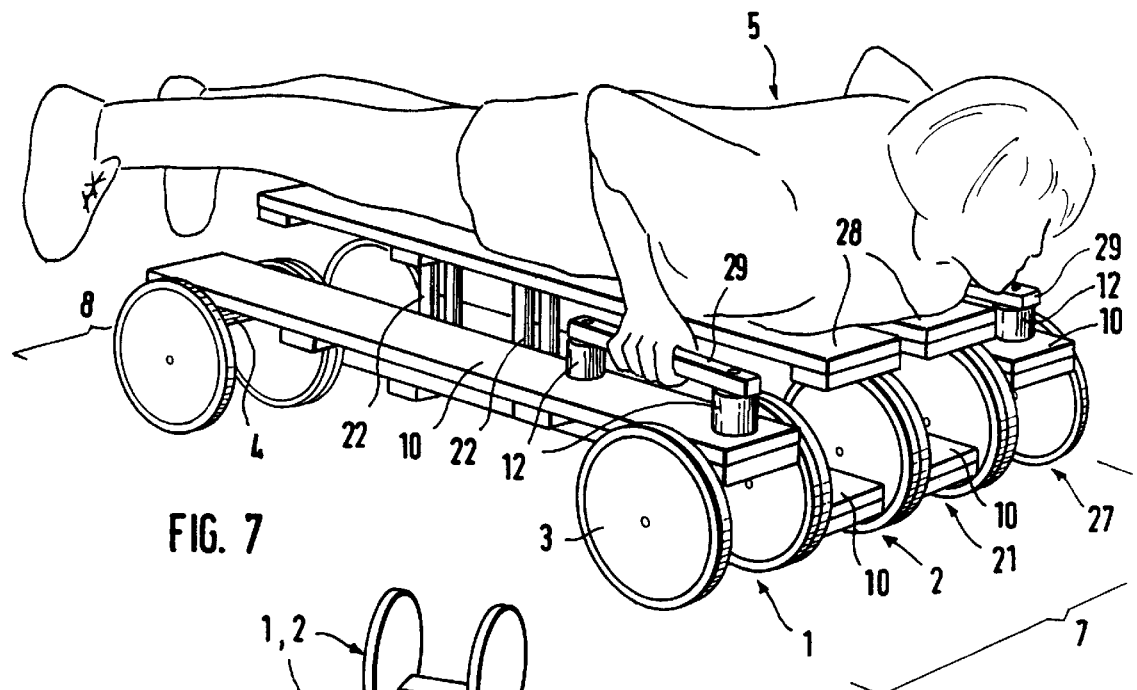
FIG. 7 shows a perspective view of a further embodiment of the propelled device according to the invention and FIG. 8 shows a perspective view of a kit for the assembly of the propelled device according to the invention in different embodiments.

By analogy with FIG. 2 and FIG. 5, according to FIG. 7 two groups 7, 8 with four base modules 1, 2, 21, 27 running next to each other in each case are coupled together via four footboards 10 extending parallel. The pedal elements 4 of the respective inner base modules 2, 21 of both groups 7, 8 are arranged in identical angular position with regard to the wheel circumference which is coincident for all wheels 3 in the front group 7 as well as in the rear group 8. The two inner footboards 10 with pedal elements 4 fixed underneath are thus always at the same height. In contrast the pedal elements 4 of the outer base modules 1, 27 are arranged in another angular position, preferably offset by 180°, so that the two outer footboards 10 always have a correspondingly displaced circumferential position with respect to the two inner footboards. Respective frames 22, which serve to carry two parallel boards for lying on 28 for the user 5, extend from the surface of the two inner footboards 10. The two boards for lying on 28 each run coincidently with the two inner footboards 10. Handle strips 29 are fixed to the two outer footboards 10 in the front region. To enable the user 5 to place his or her hands round them, at their respective ends they are kept at a distance from the surface of the respective footboard 10 by means of spacer sleeves 12. By means of the handle strips 29 a force and hence a torque may be transmitted to the two outer footboards 10, by means of which the entire propelled device is set into a rotary and/or travelling movement.

Figure 8:
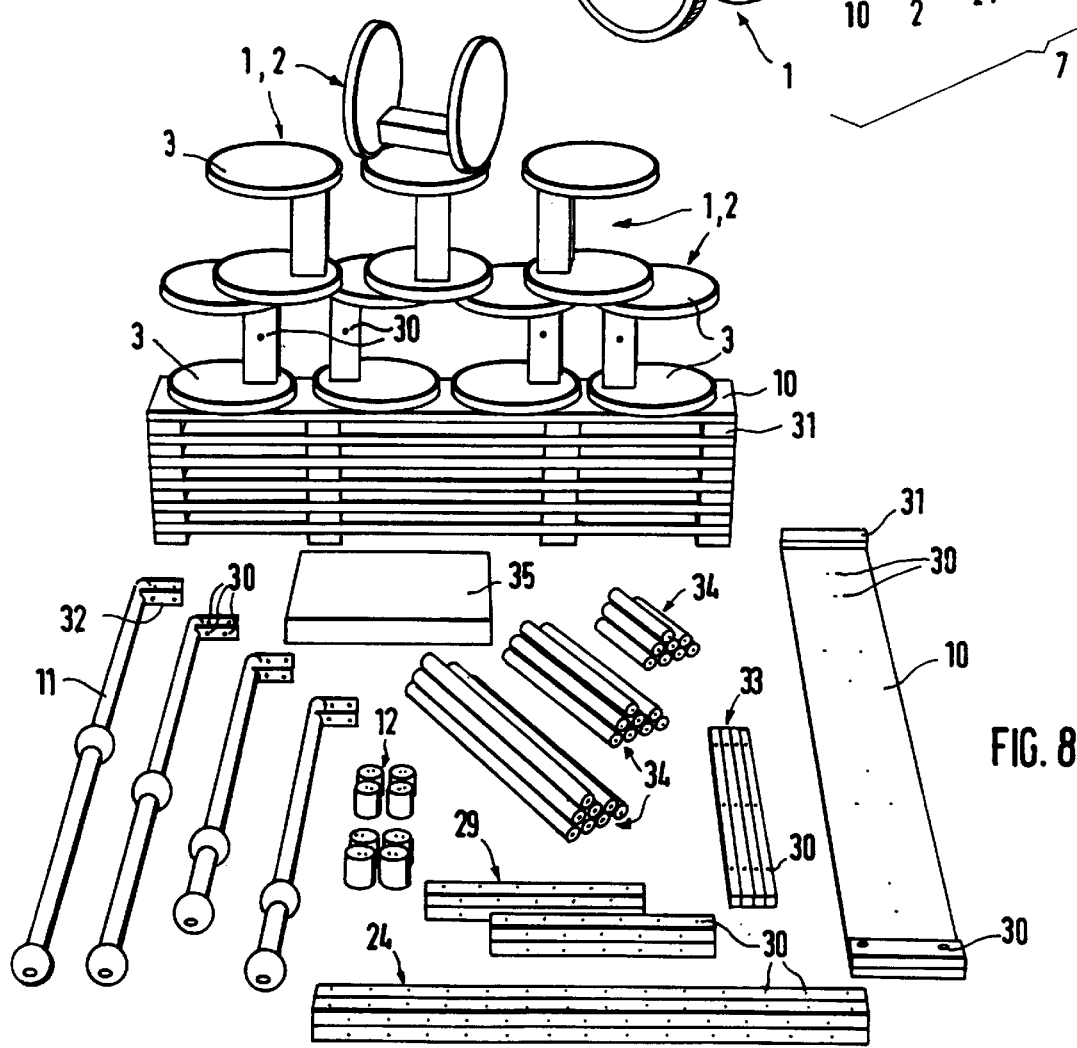

According to FIG. 8 a propelled device according to the invention can be assembled with a kit comprising the following components:

eight base modules 1, 2 with two wheels 3 in each case and one pedal element 4 in between in each case, which can be provided with an assembly bore 30;

six footboards 10 which are also provided with assembly bores 30 and, on the underside, with right parallelepiped-shaped stop or supporting bodies 31;

telescopic supports 11 of different lengths with fixing brackets 32 having flush assembly holes 30;

so-called spastics' side strips 33 for the surfaces of the footboards 10;

support rods 34 of different length for forming the frames 22;

transverse bars 24 with various assembly bores 30;

handle strips 29 with various assembly bores 30;

spacer sleeves 12;

box 35 with tool and fittings.

The toolbox 35 is preferably made of plastic and contains the following:

| | |
|---|---|
| 10 | carriage bolts M8 × 70 |
| 10 | stop nuts MB |
| 15 | washers 8 × 20 |
| 20 | sleeve nuts M6 |
| 20 | shoulder screw M6 × 32 |
| 8 | flat round-head screws M6 × 40 |
| 8 | flat round-head screws M6 × 50 |
| 8 | flat round-head screws M6 × 60 |
| 20 | flat round-head screws M6 × 80 |
| 20 | washers 0.40 × 6.4 × 3 mm |
| 10 | cap nuts M6 |
| 15 | washers 0.18 × 6.4 × 1.3 mm |
| 20 | Phillips wood screws 3.5 × 35 |
| 6 | hexagonal-head screw M6 × 110 |
| 10 | spacers M6 × 50 |
| 2 | open-ended wrenches, 10 mm/13 mm |
| 2 | Allen keys 4 mm |
| 2 | plastic spheres 0.30 mm |
| 1 | threded pin MS × 7 cm |

I claim:

1. A propelled device comprising:
   at least two base modules, each of said base modules comprising two wheels interconnected by a pedal element;
   at least four of said wheels being parallel to each other;
   each of said pedal elements being attached to said two of said wheels in the manner of a pedal crank, in that said pedal elements are each fixed to said two wheels eccentrically with respect to respective wheel center points and said pedal elements are each offset with respect to a longitudinal axis of the other of said two pedal elements;
   wherein one of the wheels of each of said modules is connected to another of said wheels by a shaft fixed to a center of each of said two wheels.

2. A propelled device in accordance with claim 1, wherein said device comprises at least one spacer between two of said base modules connected together.

3. A propelled device in accordance with claim 1, wherein said device comprises at least two groups of said base modules connected together so that said connected together base modules run parallel and are arranged one behind the other in a direction of travel.

4. A propelled device in accordance with claim 1, wherein the shaft is fixed centrically to the wheels of said two base modules.

5. A propelled device in accordance with claim 1, wherein said device comprises at least one supplementary module with two wheels which are connected via the centric shaft and are formed on outer sides thereof for eccentric coupling with said pedal elements.

6. A propelled device in accordance with claim 1, wherein said device comprises at least one supplementary module with two wheels which are connected via the centric shaft and are formed on outer sides thereof for coupling with wheels of the base modules.

7. A propelled device in accordance with claim 1, wherein one of the modules is provided with at least one support frame for supporting surfaces to receive an operator.

8. A kit for the propelled device in accordance with claim 1, wherein said device comprises at least one supplementary module comprising two wheels connected via a centric shaft, a connecting means for coupling the supplementary module with at least one base module in such a way that in a direction of travel of said device at lest four wheels run parallel with each other.

* * * * *